United States Patent [19]
Nguyen et al.

[11] Patent Number: 6,011,766
[45] Date of Patent: Jan. 4, 2000

[54] LOADING MECHANISM WITH LINEAR GEAR BAR FOR AN OPTICAL DISC DRIVE

[75] Inventors: Michael Anh Nguyen; Yong Li, both of Singapore, Singapore

[73] Assignee: Omni Peripherals Pte. Ltd., Singapore, Singapore

[21] Appl. No.: 08/935,131

[22] Filed: Sep. 22, 1997

[30] Foreign Application Priority Data

Sep. 21, 1996 [SG] Singapore ........................... 9610691-9

[51] Int. Cl.$^7$ ................................................. G11B 33/02
[52] U.S. Cl. ............................................................ 369/77.1
[58] Field of Search ..................... 369/77.1, 191, 369/192

[56] References Cited

U.S. PATENT DOCUMENTS

| | | | |
|---|---|---|---|
| 5,381,393 | 1/1995 | Ohtani | 369/77.2 |
| 5,416,763 | 5/1995 | Ohsaki | 369/77.1 |
| 5,508,994 | 4/1996 | Nakamichi et al. | 369/192 |
| 5,764,616 | 6/1998 | Kim et al. | 369/191 |
| 5,781,523 | 7/1998 | Ozawa et al. | 369/77.1 |
| 5,784,344 | 7/1998 | Ahn | 369/36 |
| 5,844,880 | 12/1998 | Motoki et al. | 369/38 |

*Primary Examiner*—David D. Davis
*Attorney, Agent, or Firm*—Lawrence Y.D. Ho; David D. Chung; Jacqueline C.T. Lui

[57] ABSTRACT

A disc loading mechanism for a optical disc drive,. The loading mechanism includes a chassis, loader tray, a linear gear bar, lifter, motor, gear train, and a sub-chassis. The pivoting sub-chassis, which supports an optical reader, rotates around a fixed axis and has 1-degree of freedom. The loader tray is slidably attached to the chassis such that it can move from a fully out-position, the position where a disc would be loaded, to a fully in-position, the position where the optical reader would engage the disc. The linear gear bar has a long rigid body with gear teeth along the length of its body. It is slidably attached to the loader tray and performs multiple functions including facilitating the movement of the loader tray, the lifting of the sub-chassis, and the timing of the loading mechanism.

26 Claims, 17 Drawing Sheets

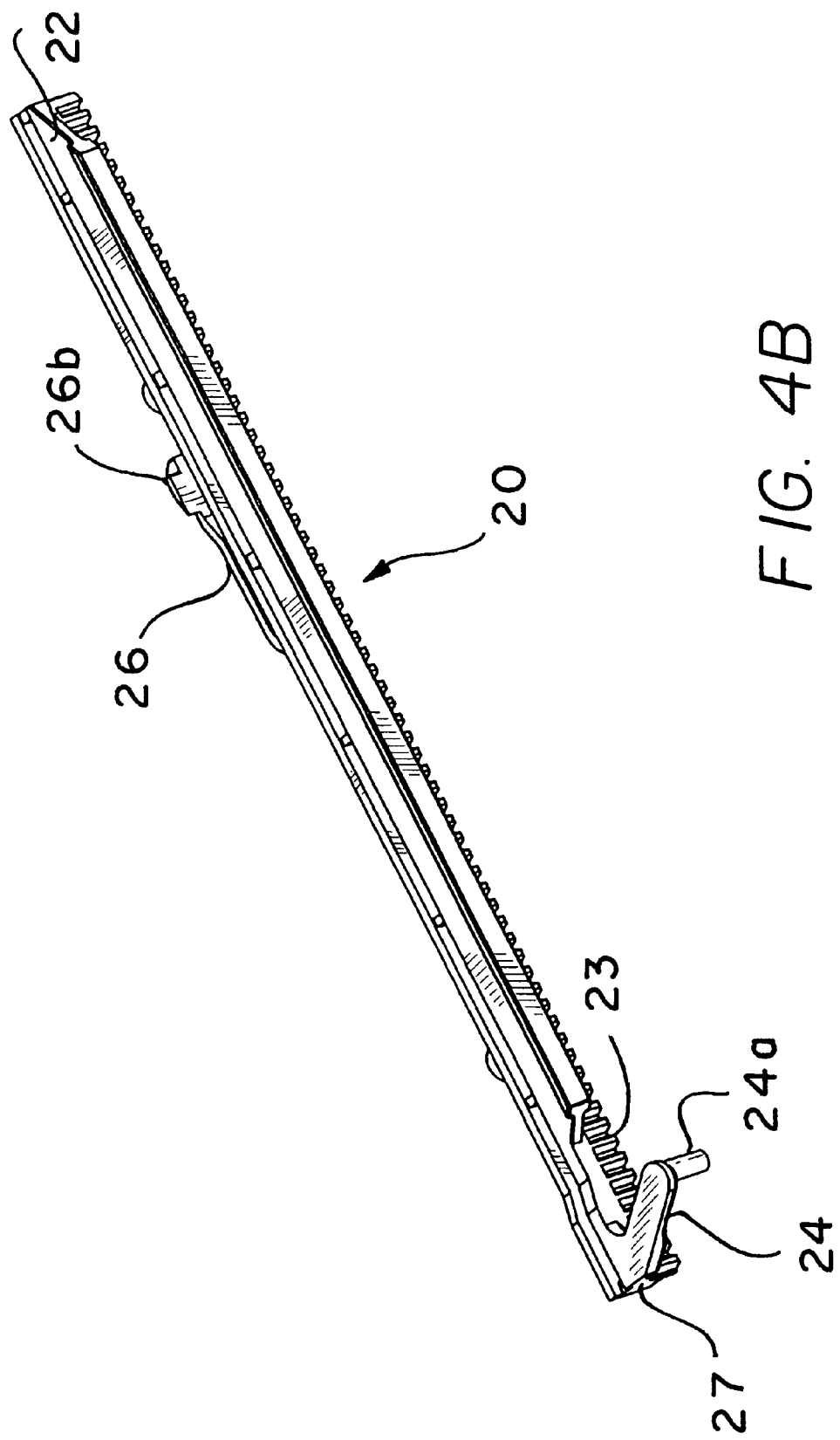

LOADING MECHANISM WITH LINEAR GEAR BAR FOR AN OPTICAL DISC DRIVE

FIELD OF THE INVENTION

This invention relates the field of optical disc drives, and particularly to a disc loading mechanism with a linear gear bar.

BACKGROUND OF THE INVENTION

Optical disc drives and disc loading mechanism are generally well known to those skilled in the art. There are two major movements during the loading of an optical disc disc into an optical disc drive. The first is the sliding movement of the loader tray into the drive. The second is the movement by which the optical reader is placed in position to read the disc. The second movement is often accomplished by pivoting up the tray which supports the optical reader from an lowered position to a raised position. Because these two movements are comparably different, and must occur at different, but at a selected pre-determined times, the loading mechanism must be able to both reliably facilitate the movement and the timing of the loading process.

In the recent years, many improvements have been made to the loading mechanism to make the optical disc drive system more stable, reliable, less complex, cheaper, etc. Some of these improvements are detailed in, among others, U.S. Pat. No. 5,381,393 and 5,416,763. Despite the many improvements, the loading mechanism of the most current optical disc drives still employ many similar components such as circular gears and belts for facilitating the loading process and for synchronizing the movements of the various parts.

Many of these current mechanisms can include relatively large number of components, some of which require some skill and labor to put together. Yet some of these parts and processes can be eliminated, reduced, or combined to provide a more efficient loading mechanism. In the optical disc drive manufacturing industry where the drives are produced in high quantities, it is highly desirable to have a mechanism which uses the least number of components possible, and which is adapted for easy assembly. In light of the continual evolution of the loading mechanism for optical disc drives, it would be desirable to have a loading mechanism which further reduces the complexity, which is versatile, and which is highly adaptable for high-volume manufacturing.

OBJECT OF THE INVENTION

It is therefore the object of the present invention to provide a loading mechanism for an optical disc drive which uses a linear gear bar system which reduces the complexity associated with the prior art systems, and which can be more easily produced in a mass manufacturing setting.

SUMMARY OF THE INVENTION

The present invention is a disc loading mechanism for an optical disc drive. The loading mechanism generally includes a chassis, loader tray, a linear gear bar, lifter, motor, a gear train, and a sub-chassis. The pivoting sub-chassis, which supports an optical reader, rotates around a fixed axis and has 1-degree of freedom. The loader tray is slidably attached to the chassis such that it can move from a fully out-position, the position where a disc would be loaded, to a fully in-position, the position where the optical reader would engage the disc. The linear gear bar has a long rigid body with gear teeth along the length of its body. At an end of its body is a slanting arm which protrudes out on an angle from the rigid body. The body also has two pegs which are adapted for slidably attaching the gear bar to the toader tray, One of the main functions of the year bar is to facilitate the movement of the loader tray. This is accomplished through a motor which drives the gear train which in turn drives the gear bar. The gear train has two gear wheels, one having teeth which can mate with the teeth on the gear bar. The rotational movement of the gear train is converted into the linear movement of the gear bar as the respective gear teeth interact.

Besides facilitating the movement of the loader tray, the gear bar serves the important function of controlling the timing of the raising of the lifter tray in relation to the position of the loader tray. The gear bar is attached to the loader tray in such a way that it can take on two possible positions, a first position and a second position. When the loader tray moves from the fully out-position to the fully in-position, the gear bar is fixed in the first position and moves with the loader tray. When the loader tray reaches its fully in-position, the slanting arm is placed in a position to begin engaging the lifter to raise the sub-chassis. After the loader tray is placed in the full in-position, the loader tray is fixed in its position and the gear bar is released from it fixed first position and is allowed to slide along the loader tray. As the motor continually rotates, the gear train moves the gear bar towards its second position. During this movement, the slanting arm rotates the lifter in a clockwise position to raise the sub-chassis. When the gear bar reaches its second position, the motor stops.

BRIEF DESCRIPTION OF THE DRAWINGS

FIG. 4B is a perspective diagram of the isolated gear bar showing a side opposite to side shown in FIG. 4A.

DETAILED DESCRIPTION OF THE DRAWINGS

Figure 1:
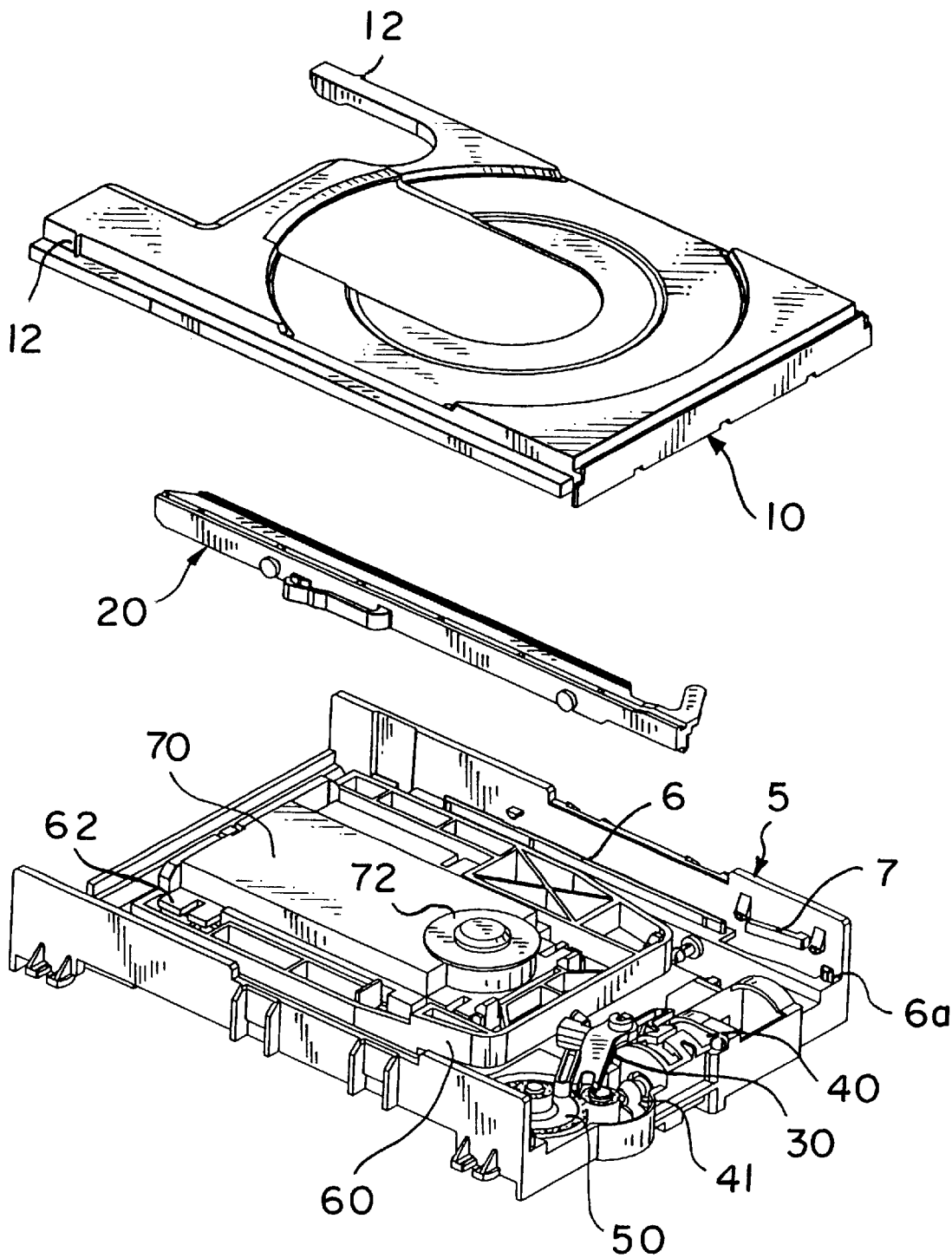
FIG. 1 is a perspective diagram illustrating the overall configuration of the present invention.

FIG. 1 illustrates the preferred embodiment of the loading mechanism of the present invention disposed inside an optical disc drive. The optical disc drive is shown here with a standard optical reader 70 with a spindle turn table 72. The loading mechanism generally includes the chassis 5, loader tray 10, linear gear bar 20, lifter 30, motor 40, gear train 50, sub-chassis 60. To better illustrate the components of the present invention, the loader tray 10, which is usually attached to the linear gear bar 20, and the gear bar 20 itself, have been removed from their normal configuration such that the features of the loading mechanism may be viewed more easily.

Figure 7:
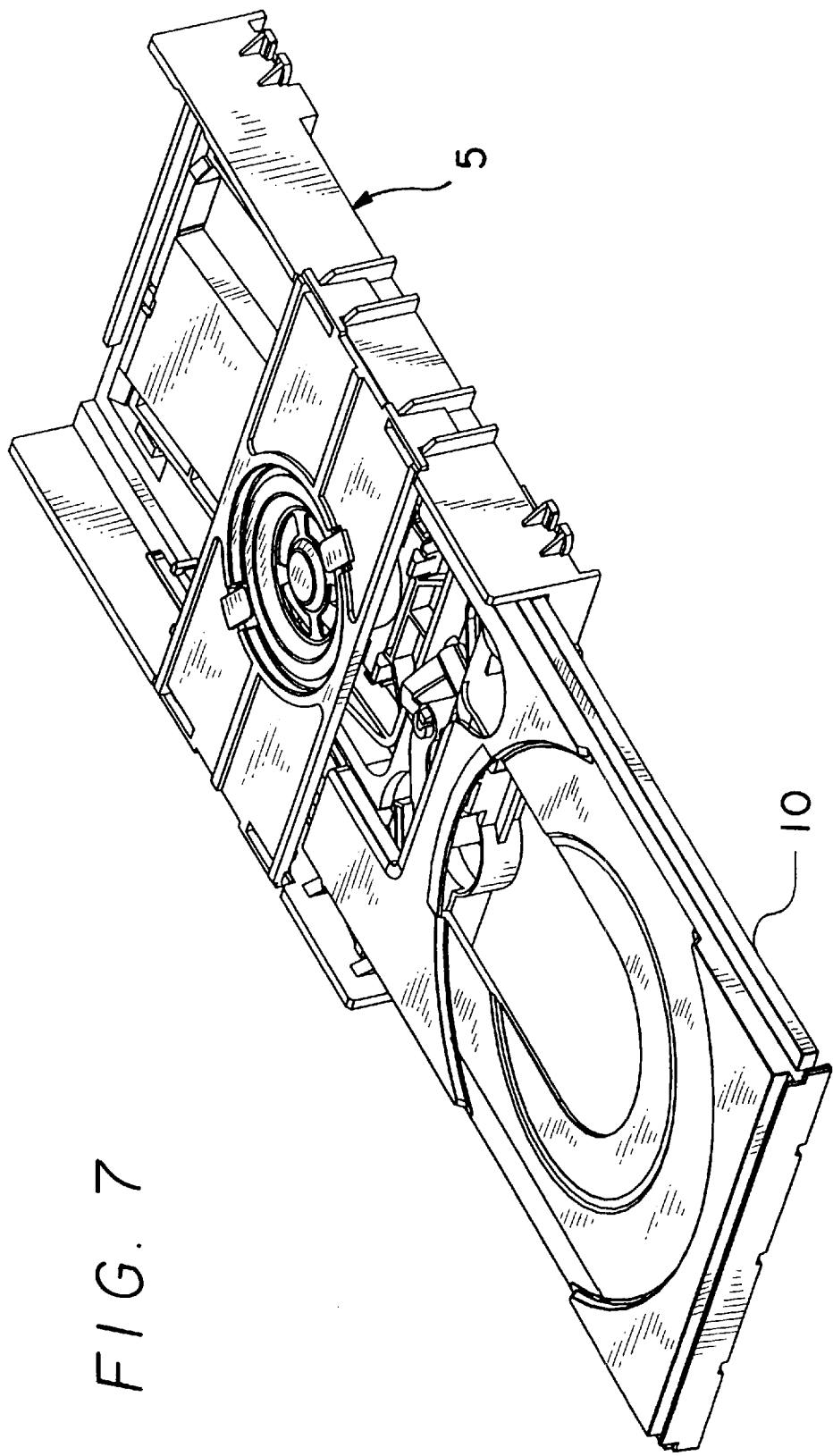
FIG. 7 is a perspective view of an optical disc drive with the tray loader in its fully out-position.

In the normal configuration, as shown in FIG. 7, the loader tray 10 and the chassis 5 are slidably mated such that the tray 10 can slide along the chassis 5 with relative ease, and the gear bar 20 comes between the loader tray 10 and the chassis. To facilitate this mating scheme, the loader tray has a pair of channels 11, as better shown in FIG. 2A. These channels 11 are mated with thin guide strips 6 and 6a disposed on the chassis 5 as can be seen in FIG. 1 and FIG. 3. Each of the channels 11 terminates to a closed end 11b and has an unblocked opening 11a in the front.

Figure 8A:
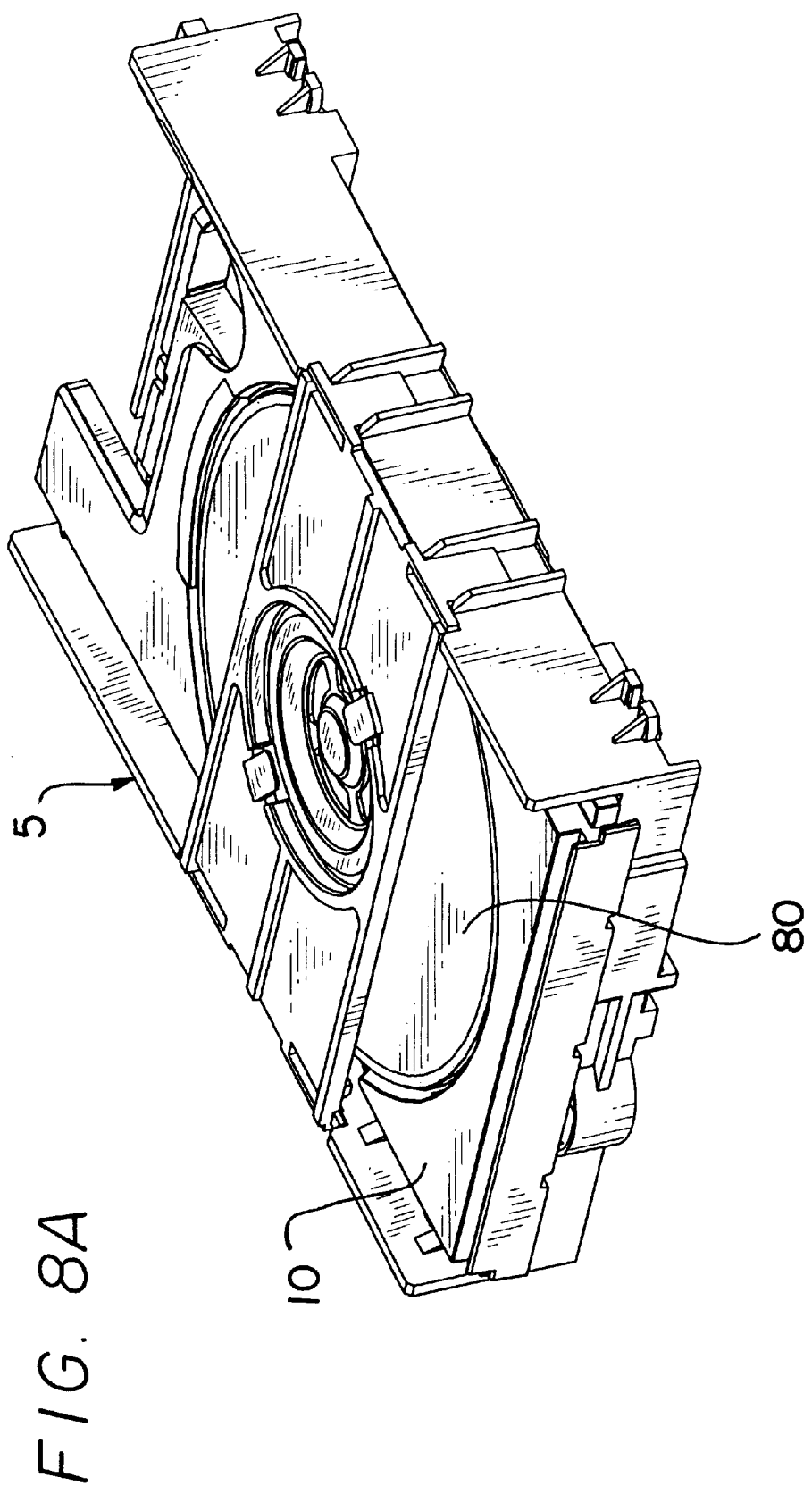
FIG. 8A is a perspective view of an optical disc drive and an optical disc with the tray loader in its fully in-position.
Figure 8B:
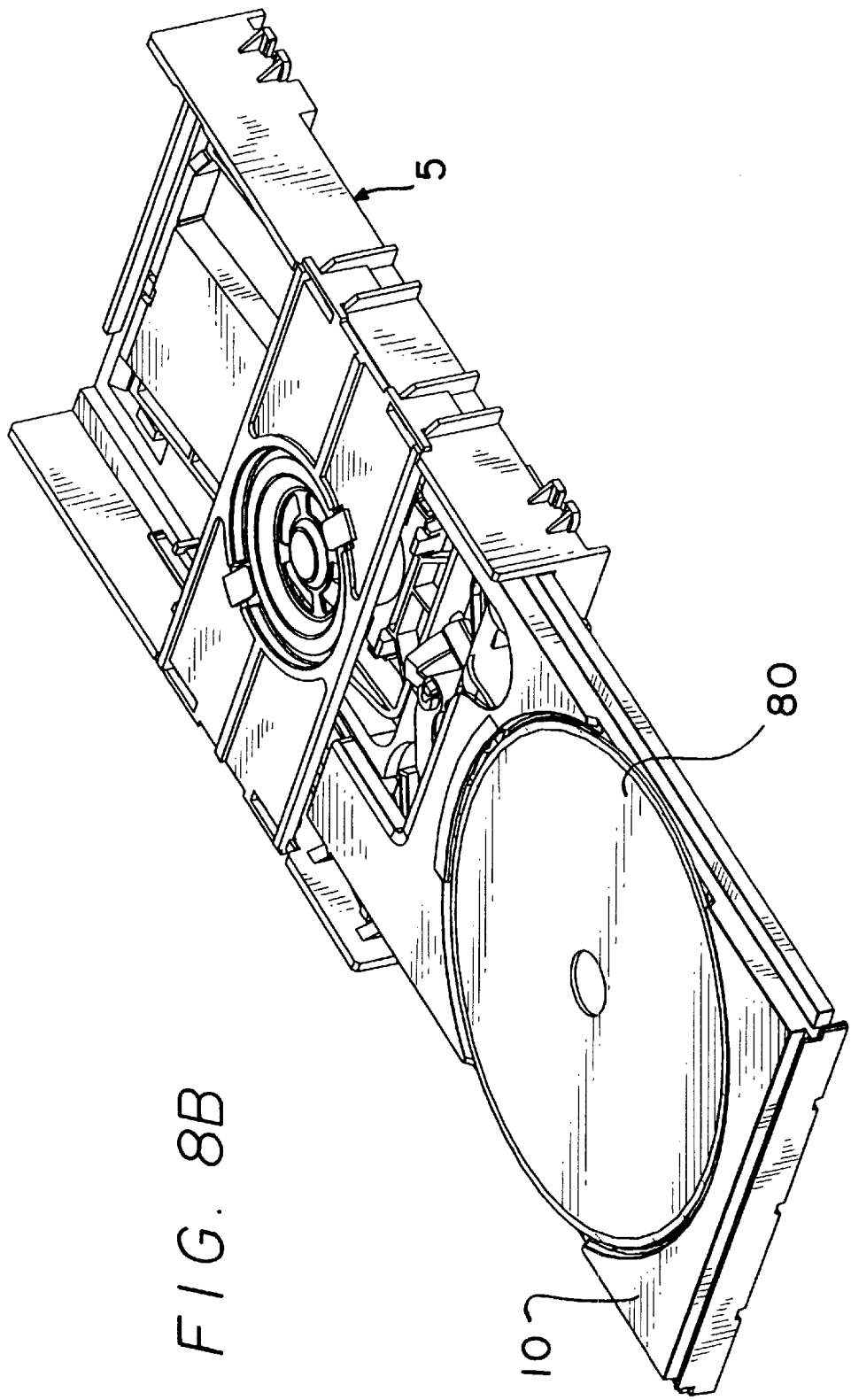
FIG. 8B is a perspective view of an optical disc drive and an optical disc with the tray loader in its fully out-position.

Two extreme positions are possible for the loader tray 10 in relation to the chassis 5: the fully in-position, FIG. 8A and the fully out-position, FIG. 8B. The fully out-position of FIG. 8B is the position where the tray 10 is in a position where it most of its body is not overlapping with the body of the chassis 5. In this position an optical disc 80 can be loaded onto the tray. To prevent the tray 10 from actually disengaging from the chassis 5, a latch 7, shown in FIGS. 1 and 3, is provided on the chassis to catch an extended portion 12, shown in FIG. 1, of the tray 10. The fully in-position of FIG. 8A is a position where the body of the loader tray 10 is fully overlapped With the body of the chassis 5 and in position to allow the turn table 72 of the optical reader 70 to engage the disc 80. In the full in-position, the closed ends 11b of the channels 11, rest squarely against the guide strips 6a.

Figure 2A:
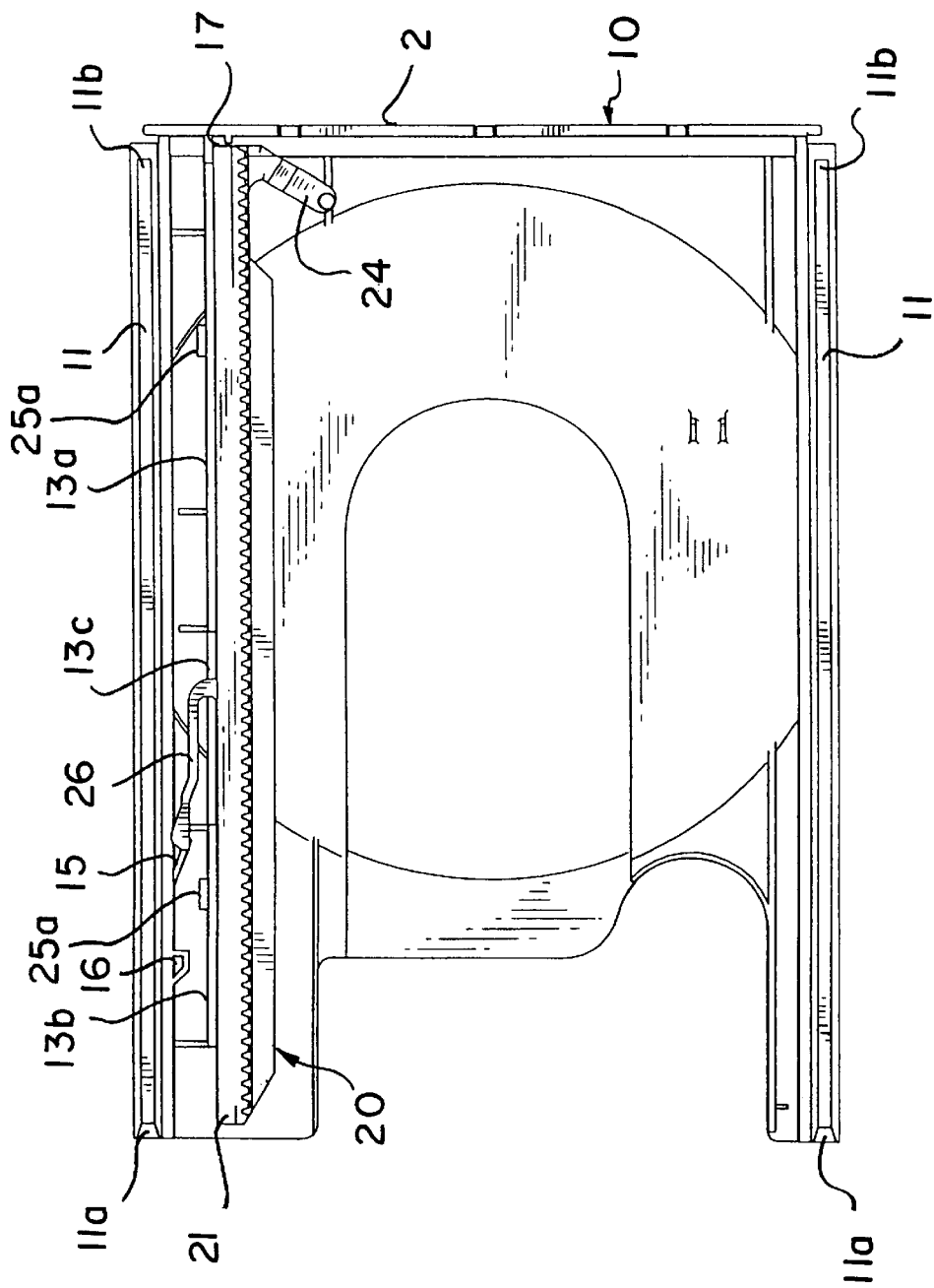
FIG. 2A is a plan view of the bottom side of the loader tray with the gear bar in its first position.
Figure 2B:
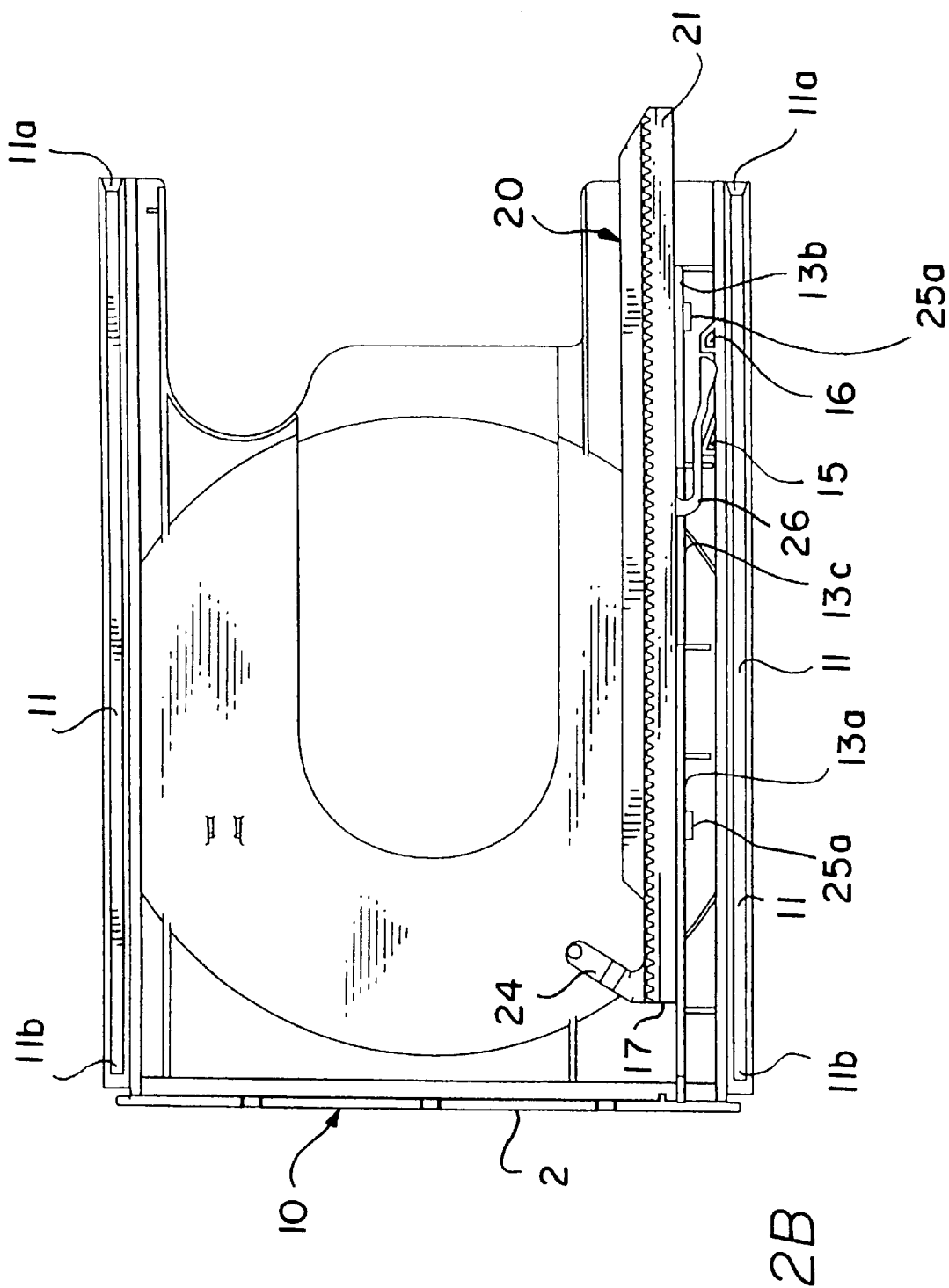
FIG. 2B is a plan view of the bottom side of the loader tray with the gear bar in its second position.
Figure 3:
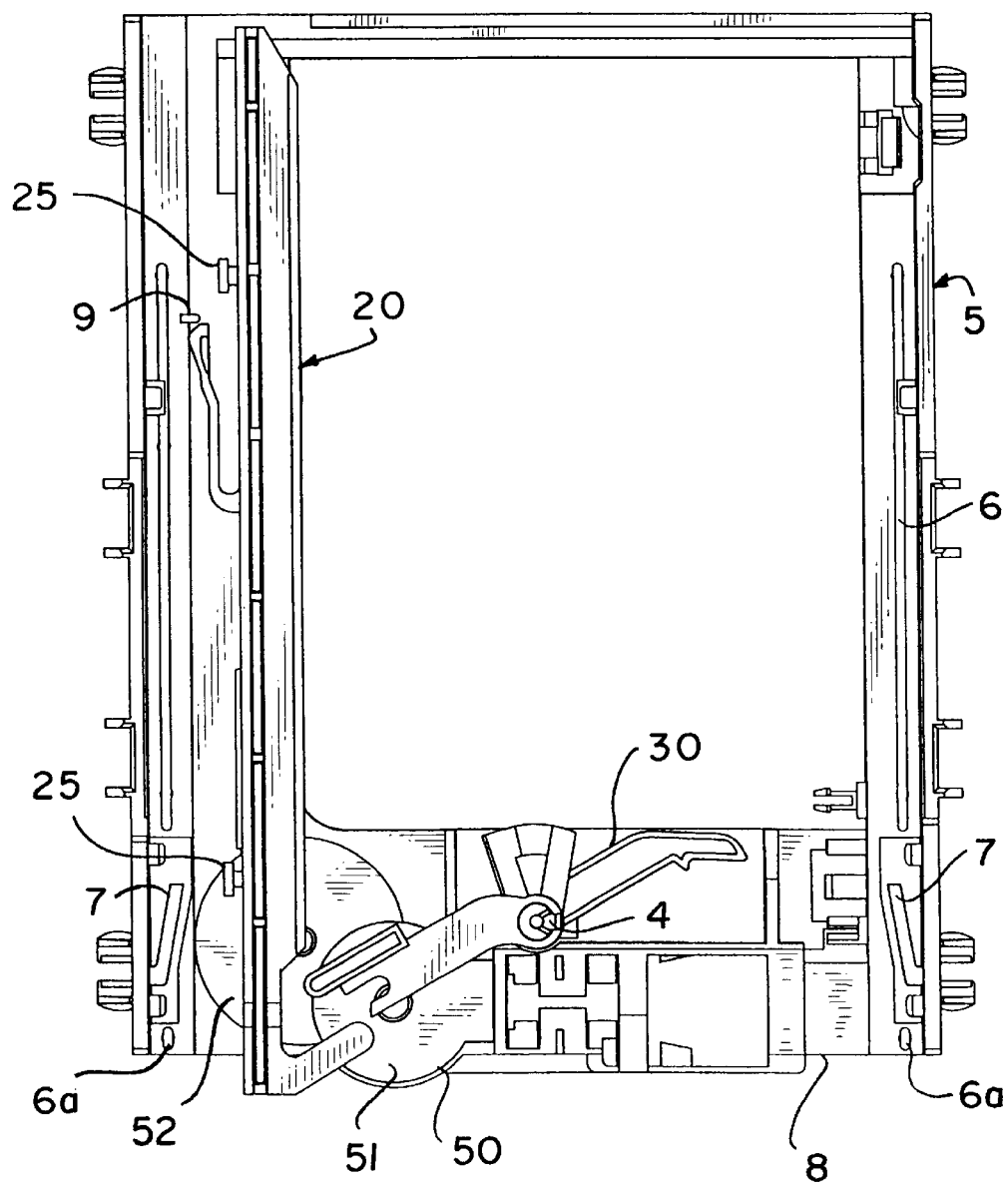
FIG. 3 is a plan view of the chassis as the gear bar approaches the full in-position.

As shown in FIG. 2A and 2B, the gear bar 20 is attached to the bottom side of the loader tray 10. Two extreme position are possible for the gear bar 20 in relation to the loader tray 10: the first position and the second position. When the loader tray 10 is in its fully out-position, the gear bar 20 must be in its first position. However, when the loader tray 10 is in its fully in-position, the gear bar 20 is in the first position initially, and then moves to the second position, without the loader tray 10 changing its position. The first position is illustrated in FIG. 2A, and the second position is illustrated in FIG. 2B. The importance of these two positions will become apparent in the following description that illustrates the interaction among the gear bar 20, lifter 30, gear train 50 and the sub-chassis 60. For now, it is important to describe its structural relationship with the tray loader 10.

Figure 4A:
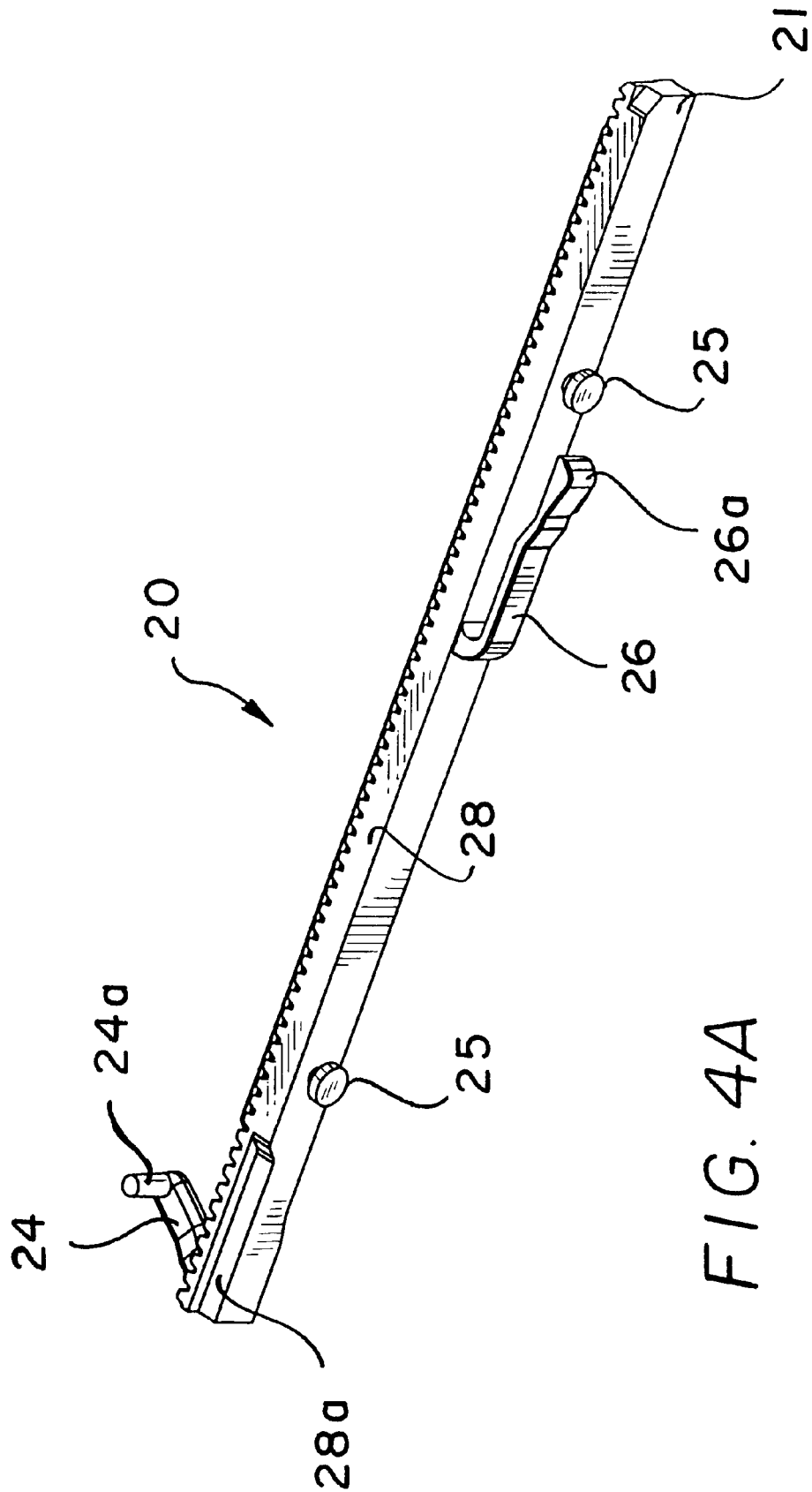
FIG. 4A is a perspective diagram of the isolated gear bar.

The structural details of the gear bar 20 are shown in FIGS. 4A and 4B. The gear bar 20 has a long, rigid, linear body 21 with a thin panel 22 projecting out of the body 21, Along the length of the body 21 and adjacent to the thin panel 22 are gear teeth 23 which are designed to interact with other complementary set of gear teeth. At a back end 27 of the body 21 is a slanted arm 24 protruding out from the same side as the gear teeth 23. The slanted arm 24 has a cylindrical tip 24a which protrudes out perpendicularly to the slanted arm 24. On the opposite side of the gear teeth 23 are two spiced-apart pegs 25 having an head 25a and a thinner neck portion 25b (the head 25a and neck 25b are better illustrated in FIG. 5). In between the pegs 25 is a flexible claw 26 having an sloping head 26a and a lateral fin 26b.

Figure 2C:
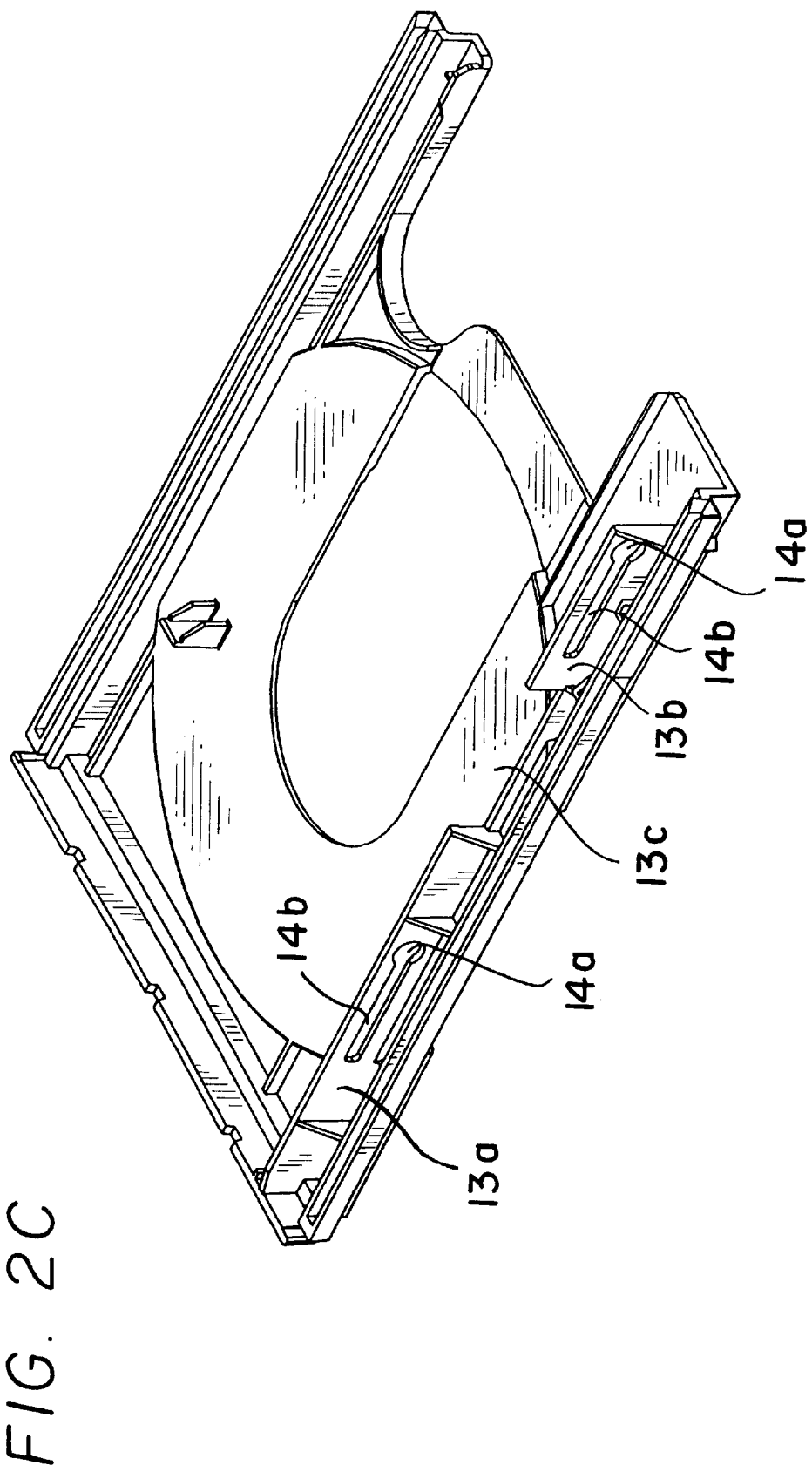
FIG. 2C is a perspective view of the bottom side of the loader tray with the gear bar removed.

Now referring to FIGS. 2A, 28, and 2C, the gear bar 20 is slidably attached to a two thin panels, 13a and 13b, which are separated by a gap 13c, with the back end 17 of the gear bar 20 near the front end 2 of the loader tray 10. The two thin panels 13a and 13b each has an empty cavity with a rounded portion 14a and a elongated portion 14b. The rounded portion 14a is big enough to let the head 25a of the peg 25 fully through while the elongated portion 14b is narrow enough to prevent the head 25a from lefting through but wide enough to accommodate the neck portion 25b of the peg 25. As such, the neck portion 25b of the peg 25 can slide along the elongated portion 14b of the thin panels 13a and 13b restricted only by the length of the cavity. Therefore, the entire gear bar 20 can slide along the thin panels 13a and 13b.

When the gear bar 20 is in the first position, as illustrated in FIG. 2A, the pegs 25 are at the elongated portion 14b of the cavity at an end opposite to the rounded portion 14a. In this position, the flexible claw 26 is in the gap 13c and positioned such that the lateral fin 26b is flush against a triangular stop 15. The triangular stop 15 essentially prevents the gear bar 20 from sliding along the thin panels 13a and 13b, and thus completely represents the movement of the gear bar 20 relative to the loader tray 10. This blockage, however, can be moved if the flexible claw 26 is bent inward towards the gear body 21 such that the lateral fin 26b is no longer engaged against the triangular stop 15.

When the gear bar 20 is in the second position, as illustrated in FIG. 2B, the pegs 25 are at the rounded portion 14a of the cavity, In this position, 25 the flexible claw 26 is substantially overlapped with the thin panel 13b such that the panel 13b is between the flexible claw 26 and the gear body 21, and the lateral fin 26b is flush against a rectangular stop 16. The rectangular stop 16 prevents the gear bar 20 from sliding forward, though the gear back may still slide backward towards the first position.

Figure 9A:
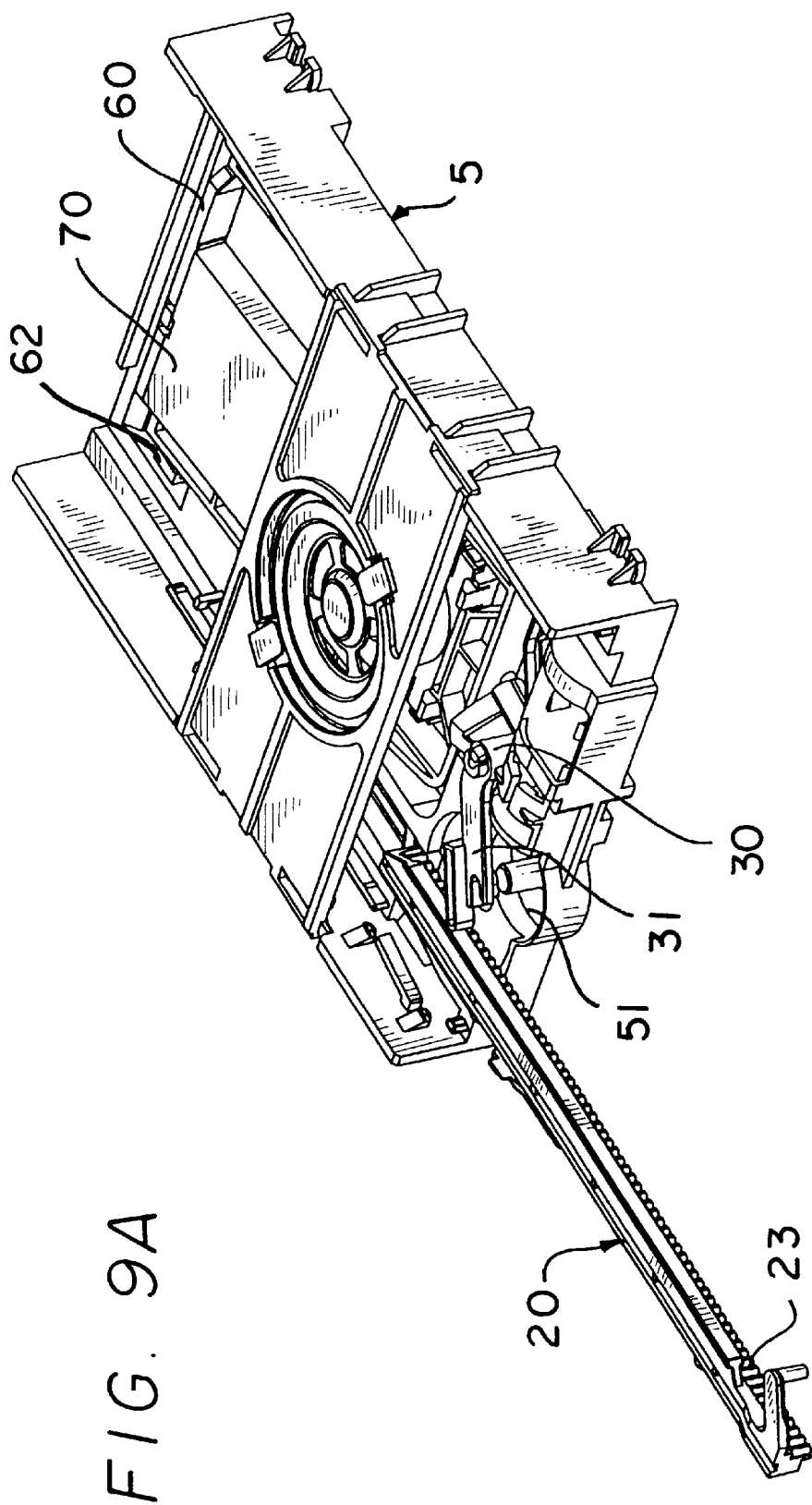
FIG. 9A is a perspective view of the loading mechanism with the gear bar in its fully out-position.

Now that the structural relationship between the gear bar 20 and the loader tray 10 has been established, the structure of the rest of the mechanism and its relationship with the gear bar 20 shall be described. FIG. 9A illustrates the loading mechanism (with the loader tray removed from the view) in the fully out-position. In this position, the sub-chassis is 60 is in the lowered position such that the optical reading device 70 is sufficiently away from the path of the loader tray 10 (not shown in this figure) which needs to be slide into place. The sub-chassis 60, which supports the optical reading device 70, pivots along a fixed axis 62, and hence has only 1 degree of freedom. This limitation in the movement of the sub-chassis is important because it is resistant to excessive vibrational movement during an optical reading process, and hence facilitates overall stability of the overall system.

Figure 10A:
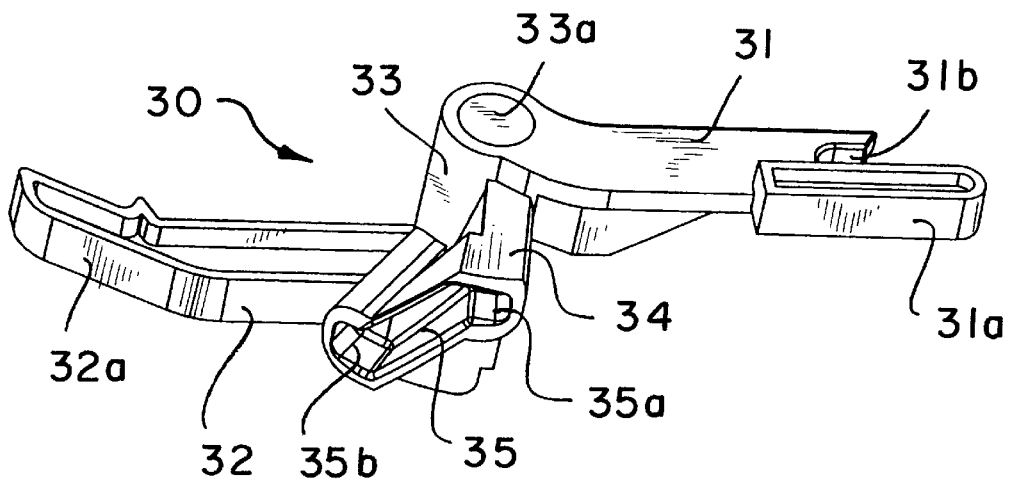
FIG. 10A and 10B are perspective diagrams showing the two views of the lifter.
Figure 10B:
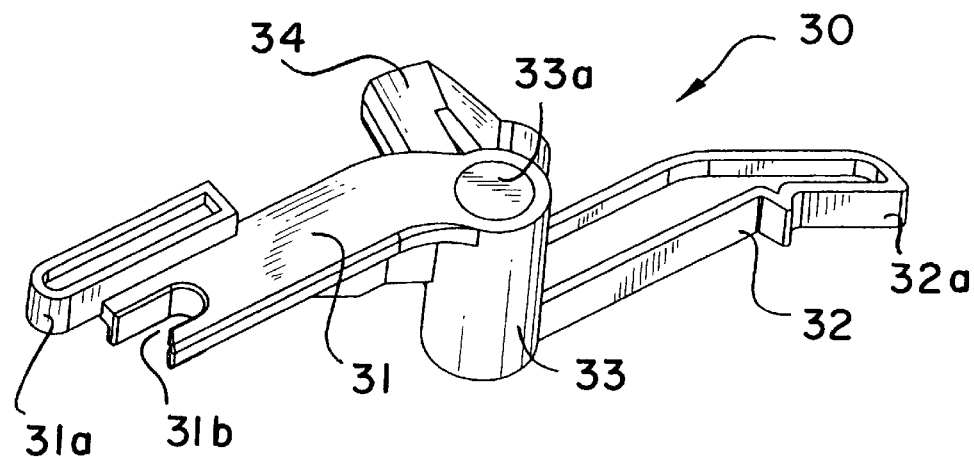
Figure 10C:
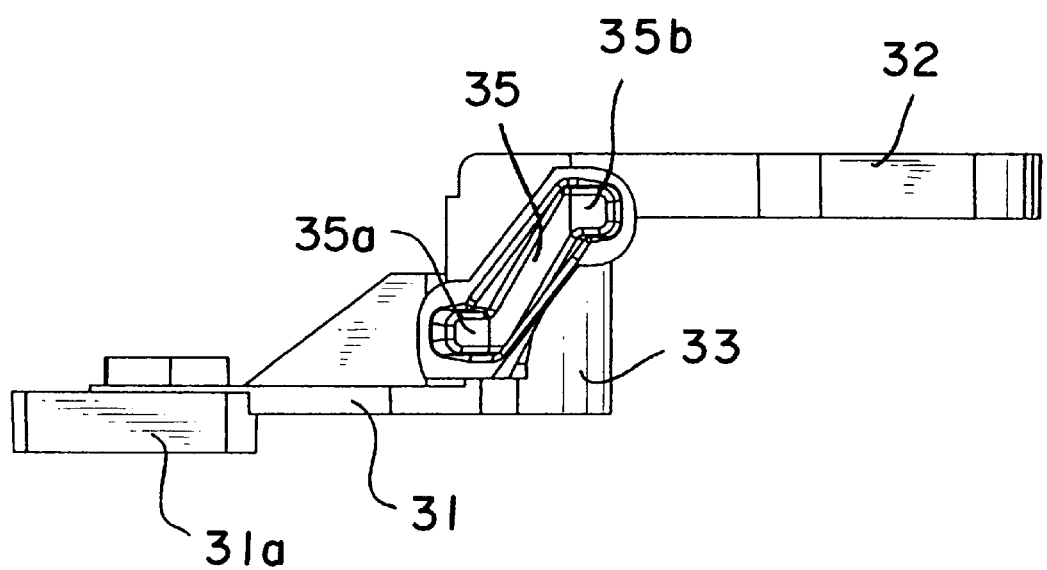
FIG. 10C is a side view of the lifter of FIG. 10A and FIG. 10B.
Figure 11:
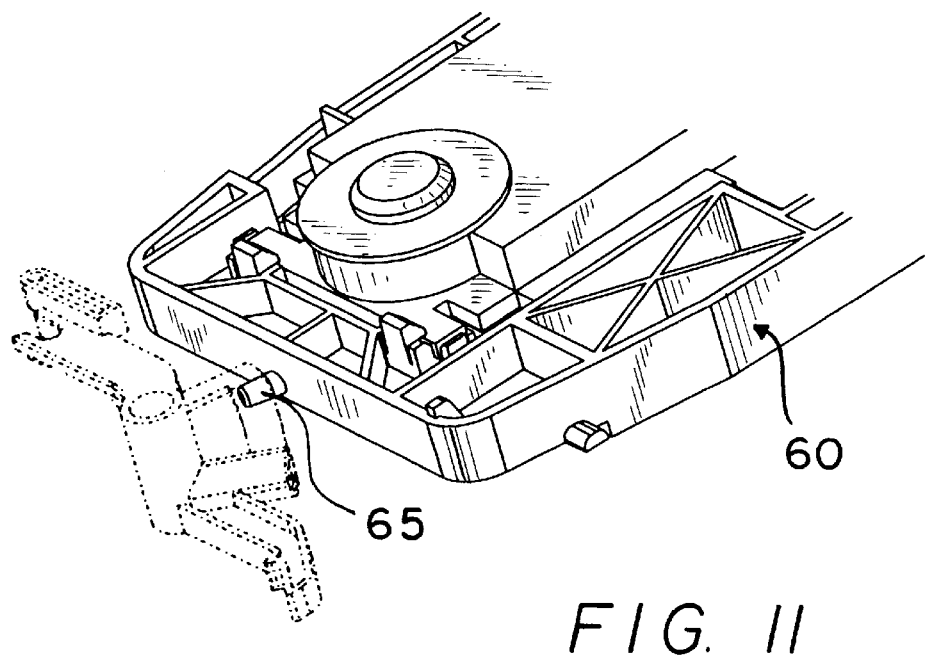
FIG. 11 is an exploded view of the sub-chassis illustrating how the nipple on the sub-chassis engages with the slanted slit in the lifter.

The raising and lowering of the sub-chassis 60 is accomplished by the lifter 30. The details of the lifter 30 are illustrated in FIGS. 10A, 10B, and 10C. The lifter 30 includes an upper arm 31 and a tower arm 32, both of which protrude out perpendicularly from a cylindrical main body 33 and which extend out substantially in opposite directions from each other. The upper arm 31 has a finger 31a and a rounded cavity 31b at the end of the arm 31. The cylindrical body 33 has a hole 33a which extends through the length of the body and a wing segment 34 which extends out from the side of the cylindrical body 33. On the face of the wing segment 34 is slanted slit 35 which is angled in relation to the axis of the cylindrical body 33. The slanted slit 35 has an upper end 35a and a lower end 35b, each having a rounded cavity.

Now referring to FIGS. DA, 10A, 10B, and 10C, the lifter 30 is mounted on a pole 4 which is fixed to the chassis 5. The hole 33a of the lifter 30 is fitted onto the pole 4 such that it is reasonable snug, but still loose enough for the lifter to rotate freely. The slanted slit 35 faces the sub-chassis 60 with the nipple (hidden from view) of the chassis 60 inside the slanted slit 35. The nipple is simply a protruding short, cylindrical piece which is fixedly attached to the sub-chassis 60 and which is slidably fitted into the slanted slit 35. In the full out-position, nipple is at the lower end 35a of the slanted slit 35 and fitted snugly in the rounded cavity. Both the lower and upper arms, 32 and 31 respectively, are slanted in relation to the plane defining the front side 8 of the chassis 5.

The structural relationship between the lifter 30 and the sub-chassis 60 is such that a clockwise movement (when looking down from above) of the lifter 30 would cause the nipple to slide along the slanted slit 35 until the nipple reaches the upper end 35a of the slanted slit 35, where the nipple is fitted snugly in the rounded cavity of the upper end 35a. This movement just described would, hence, raise the entire sub-chassis 60 as it pivots upward. Conversely, a counterclockwise rotational movement of litter 30 would cause the nipple to slide down along the slanted 35 until the nipple reaches the lower end 35b, and the sub-chassis 60 would pivot downward.

When the sub-chassis 60 is fully raised and the nipple is in the rounded cavity at the upper end 35a, the sub-chassis 60 is locked into position. This is because the nipple rests on a relatively flat, rather than a slanted, bottom in the cavity, and so any force exerted by the nipple in the downwardly direction (the only direction possible since the sub-chassis has only 1-degree of freedom) will exert the force only in a direction perpendicular to the plane of rotation of the lifter 30. Hence, the lifter 30 does not rotate and preventing the sub-chassis 60 from returning to the lowered position. This feature is important as it prevents the sub-chassis from; inadvertently pivoting downward.

Figure 9B:
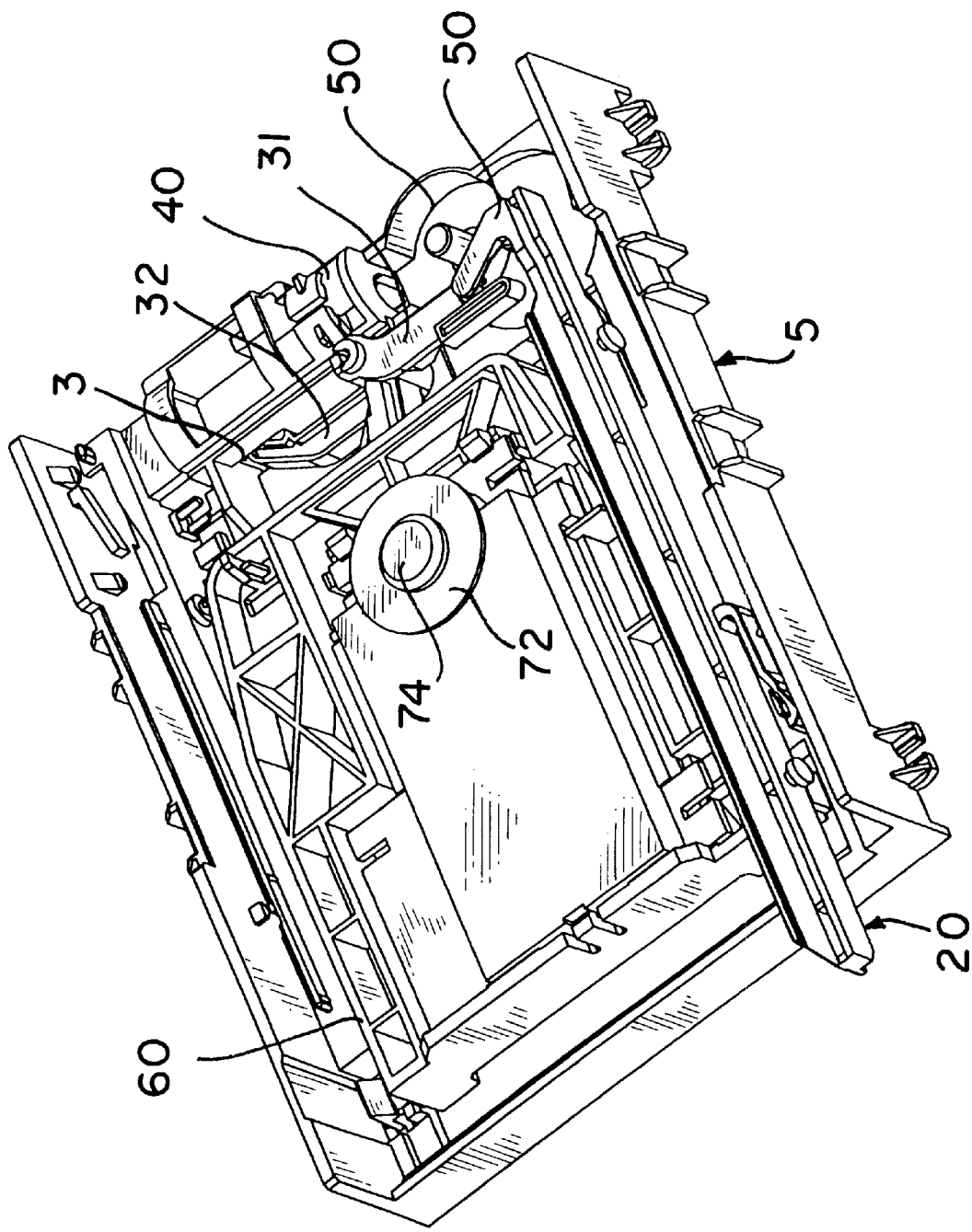
FIG. 9B is a perspective view of the loading mechanism with the gear bar in its second position.

Because the lifter 30 has this self-locking feature, there is a need for a manual releasing mechanism for disengaging the sub-chassis from this locked position in the event that there is a problem with the motor or other parts of the mechanism. This releasing mechanism is provided for by the lower arm 32 of the lifter 30. As shown in FIG. 9B and 10B, when the lifter 30 is in the locked position, the angled end 32a of the tower arm 32, becomes disposed inside the opening 3. A small hole (not shown) is provided on the outside of the chassis 5 such that a small pin can have access to the angled end 32a. To manually release the sub-chassis from the locked position, one needs to push the angled end 32a through the small opening. Although this manual release feature is highly desirable, it is hot essential to the function of the overall loading mechanism, Still referring to FIG. 9A, the teeth 23 near the back end 27 of the gear bar 20 are engaged with the teeth of the gear train 50. The gear train 50 consists of a pair of cog wheels, a small wheel 51 and a large wheel 52, which are mated to rotate simultaneously. A motor 40 has a rotor 41 with teeth which are mated with the teeth of the small cog wheel 51. Hence, the rotation of the motor rotor 41 (only visible in FIG. 1) causes the gear bar 20 to move linearly along the length its teeth 23. The configuration of the cog wheels and the motor is a well known in the art, and it should be understood that a number of variations are possible.

To initiate the movement of the tray loader 10 from the full out-position to the full in-position, the motor 40 is actuated to turn the cog wheels 51 and 52 which in turn move the gear bar 20. During this movement, the gear bar 20 is immovably fixed to the tray loader 10 as was shown in FIG. 2A and explained in detail above, Therefore, the tray loader 10 is forced to move in along with the gear bar 20. During the movement of the-gear bar 20 from the full out-position to full in-position, the sub-chassis 60 remains stationary as nothing engages the lifter 30 to raise the sub-chassis 60. Indeed, it is very important that the sub-chassis 60 is not inadvertently raised during this movement because otherwise, the spindle turntable 72 of the optical reader 70 may block the path of the incoming tray loader 10 which will result in a jam.

Figure 6:
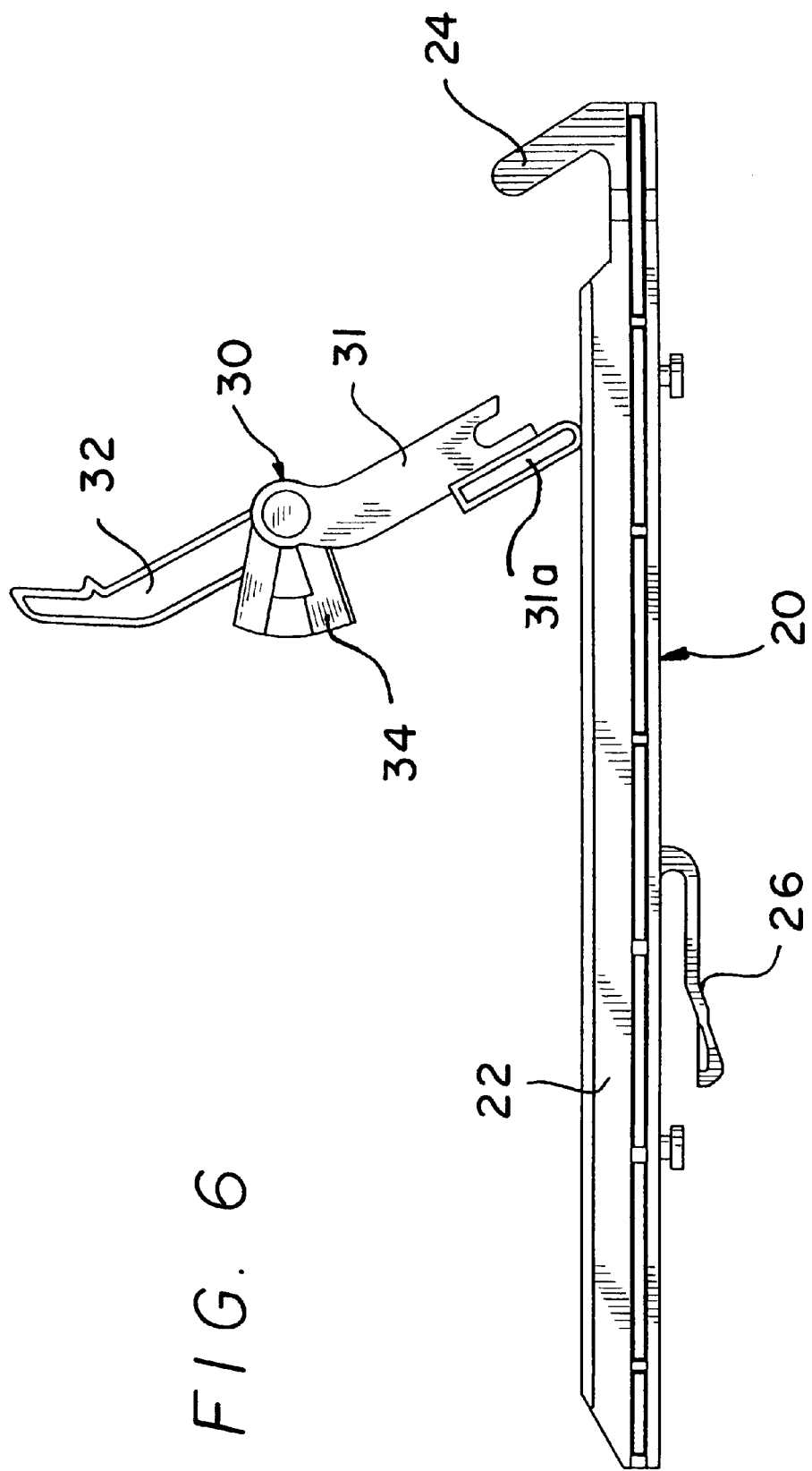
FIG. 6 is an isolated plan view illustrating the relationship between the gear bar and the lifter before the gear bar is in the full in-position.

To ensure that such an undesirable result does not occur, the gear bar 20 is provided with the thin panel 22 which prevents the lifter from turning during certain periods. FIG. 6 is an illustration of the relationship between the thin panel 22 and the lifter 30. Note that during this movement, the finger 31a of the lifter 30 is flush against the thin panel 22, and has no room to turn in a clockwise direction. Once the thin panel 22 is moved out of position however, such as in the full-in position, the thin panel 22 is no longer engaged with the lifter 30, and hence, it is free to turn in a clockwise direction.

As the gear bar 20 and the tray loader 10 approach the full in-position, shown in FIG. 3 (tray loader not shown), the cylindrical tip 24a of the slanted arm 24 nears the rounded cavity 31b of the lifter's upper arm 31. When the gear bar 20 first reaches the fully in-position, the cylindrical tip 24a has just made contact with the cavity 31b. In this position, the tray loader 10 is fully overlapped with the chassis and can no longer move in any further as the end stops 11b of the channels 11, shown in FIG. 2A, are blocked by the guide strips 6a, shown in FIG. 1. In this position, the gear bar 20, which was initially prevented from sliding along the tray loader 10, is released from this fixed first position, As can be seen in FIG. 3, the releasing block 9 of the chassis 5 climbs over the sloping head 26a of the flexible claw 26 and causes the claw 26 to bend inward. This movement consequently causes the lateral fin 26b of the claw 26, shown in FIG. 4B, which was being blocked by the triangular block 15 of the tray loader 10, shown in FIG. 2A, to be unimpeded by the block 15. Now the gear bar 20 is ready to go into its second position.

Figure 5:
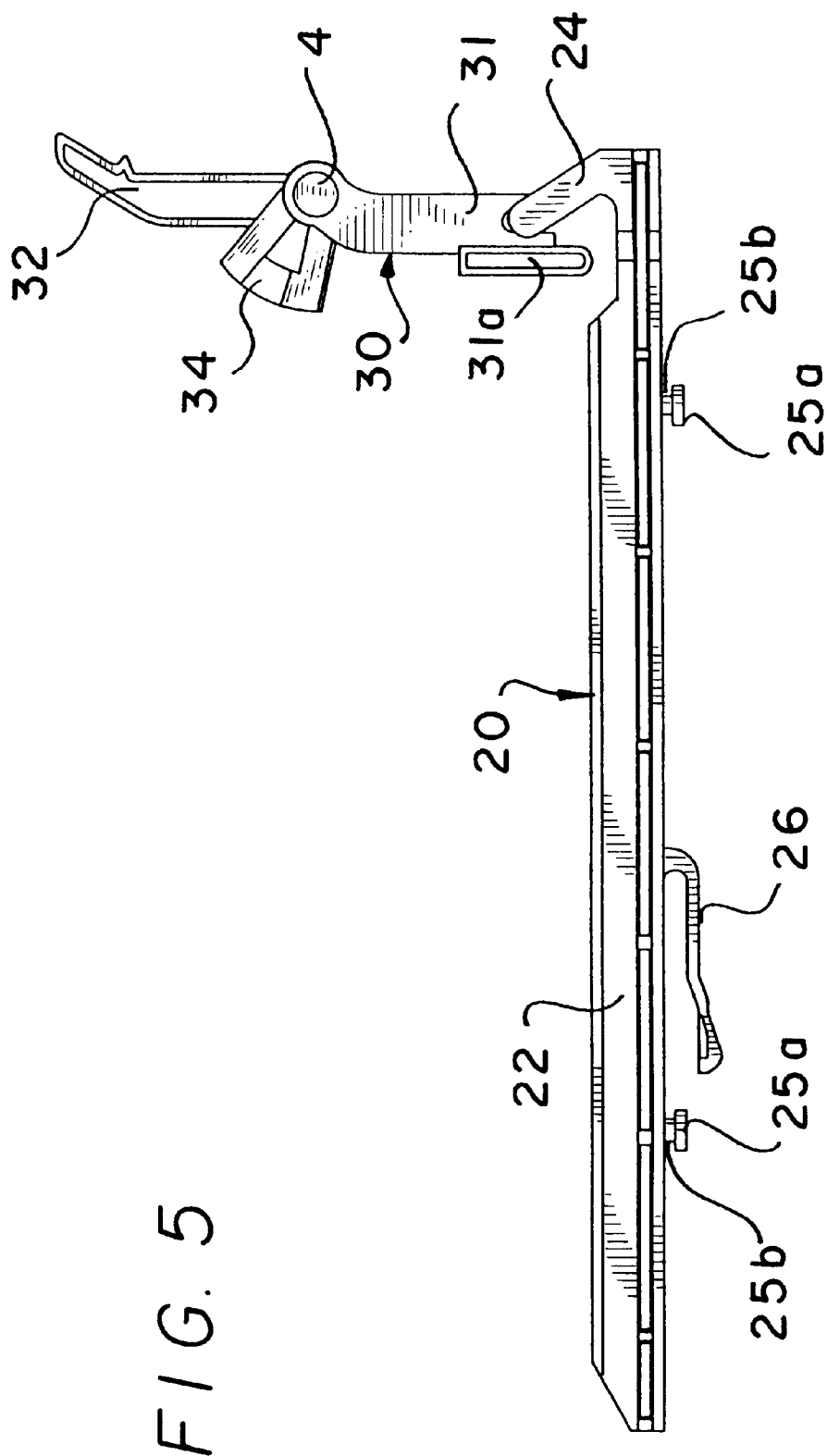
FIG. 5 is an isolated plan view illustrating the relationship between the gear bar and the lifter when the gear bar is in the second position.

The motor 40 continually turns the gear train 50 after the release of the gear bar 20 from the tray loader 10. So the gear bar 20 continually moves in while the tray loader 10 is stationary. During the gear bar's movement from the first position to the second position, the cylindrical tip 24a of the gear bar 20 is fully engaged inside the cavity 31b of the lifter's upper arm 31, as illustrated in FIG. 5. So as the gear bar 20 moves into its second position, it turns the lifter 30 in a clockwise direction, causing the sub-chassis to be raised to place the spindle turn table 72 of the optical reader 70 in position to clamp the optical disc 80. Once the gear bar 20 finally reaches its second position, shown in FIGS. 2B (showing gear bar's position in relation to the tray loader) and 9B (showing gear bar's position in relation to the chassis), it is prevented from moving any further by the rectangular stop 16 which engages against the lateral fin 26b.

Figure 12:
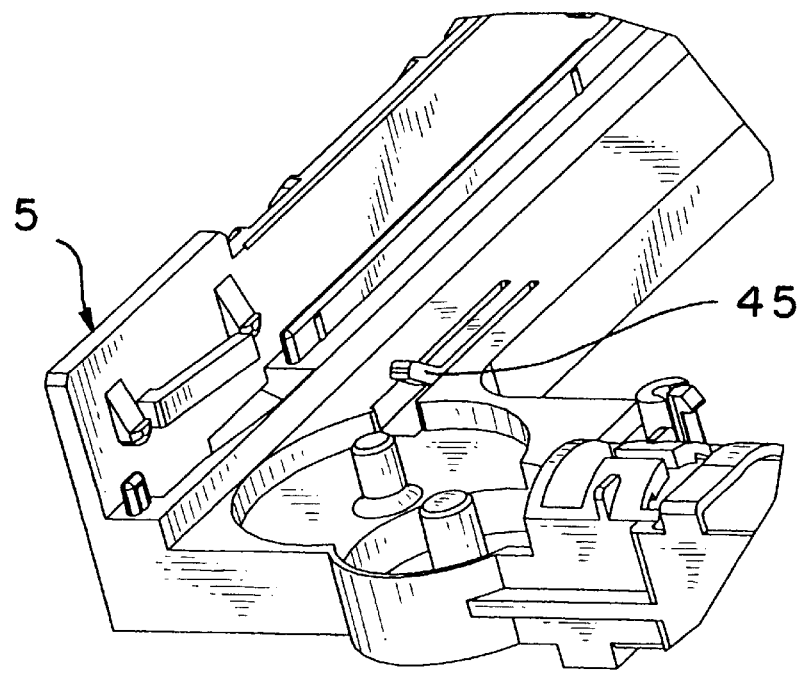
FIG. 12 is an exploded view of the chassis with the flexible ramp.

In this second position, a message is sent to the motor 40 to stop the movement by a sensor attached to the chassis and located right below the gear bar 20, As shown in FIG. 12, the sensor is a flexible ramp 45 which protrudes out above the bottom surface of the chassis 5. When the flexible ramp 45 is not engaged by the gear bar 20, it is in its raised position, the position shown in FIG. 12. When the gear bar is in place, but not in the second position, the raised surface 28, shown in FIG. 4A, presses down against the flexible ramp 45, The downward depression causes a message to be sent to the motor 40 to start the movement. When the gear bar 20 reaches the second position, however, the raised surface 28 no longer presses against the flexible ramp 45. Instead, the ramp 45 is allowed to be in its raised position as the hollowed portion 28a now engages the ramp. The movement of the ramp upward sends the message to the motor 40 that the movement is no longer necessary.

To move the loader tray 10 back out to the full out-position, the motor 40 reverses direction. The gear bar 20, which is in the second position, now slides along the loader tray 10 in the opposite direction until it is in the first position. This first movement causes the sub-chassis to be lowered as the cylindrical tip 24a of the gear bar 20, which is still engaged in the cavity, 31b, turns the lifter 30 in a counter-clockwise direction. Once in the first 10 position, the sub-chassis 60 has completely lowered and the cylindrical tip 24a of the gear bar 20 is disengaged from the rounded cavity 31a of the lifter 30. The gear bar 20 is prevented from sliding any further relative to the loader tray 10 as the gear bar 20 is blocked by the front side 2 of the loader tray 10, as shown in FIG. 2A. Now the gear bar 20 and the loader tray 10 are forced to move together. As the motor 40 continually rotates, the gear bar 20 and the loader tray 10 move together until the tray loader 10 is in the full out-position.

The present invention has many advantages over the current loading mechanism in that it is includes minimal parts to achieve the same purpose. By having various components perform multiple functions, many components are eliminated. Furthermore, because the main component, the gear bar, is linear, it is easy to align it during the assembly stage in the manufacturing process than a mechanism involving many circular gears. Moreover, the present loading mechanism offers flexibility as many of the modifications in the design can be made easily by simply relocating the various stops or adjusting the length or the features of the gear bar.

The present invention has been described in detail herein in accord with certain preferred embodiments thereof. The present invention included some components which do not have standard terms in the industry. Hence, to fully and clearly describe the details of the invention, certain descriptive names were given to the various components. Some examples are triangular stop, slanted arm, etc. It should be understood by those skilled in the art that these descriptive terms were given as a way of easily identifying the components in the description, and do not necessarily limit the invention to the particular description. For instance, the triangular stop need not be triangular. Any shaped stop would sufficiently serve the purpose, so long as it performs the function of preventing the claw of the gear bar from sliding further. Similarly, other components of the present invention having similar descriptive names may be replaced with other components which do not have the identical descriptive features listed herein. Therefore, many such modifications are possible. Accordingly, it is intended by the appended claims to cover all such modifications and changes as falling within the true spirit and scope of the present invention.

We claim:

1. A disc loading mechanism for an optical disc drive comprising:
    a motor;
    a chassis;
    a sub-chassis disposed in said chassis;
    a loader tray slidably connected to said chassis such that said loader tray can slidably move from an out-position to an in-position and from said in-position to said out-position;
    a linear gear bar slidably attached to said loader tray such that said gear bar is fixed in a first position while said loader tray moves from said out-position to said in-position, and is able to slide into a second position of said gear bar after said loader tray is moved into said in-position;
    a first mechanism for raising and lowering said sub-chassis, said first mechanism being a lifter rotatably mounted onto said chassis;
    a second mechanism for coupling said linear gear bar to said motor such that a rotational movement of said motor creates a linear movement of said gear bar;
    a third mechanism for actuating said first mechanism to raise and lower said sub-chassis, said third mechanism being an extended member of said linear gear bar, said extended member engaging with said cavity on an upper arm; and
    a fourth mechanism for stopping said motor when said gear bar is in the second position;
    wherein said sub-chassis is in a lower position as said loader tray moves from said out-position to said in-position, and said first mechanism is actuated to raise said sub-chassis from a lower position to an upper position as said linear gear bar moves from said first position to said second position.

2. The disc loading mechanism as recited in claim 1 wherein said lifter has a cylindrical body with a hole, an upper arm with a cavity and a wing portion with a slanted slit.

3. The disc loading mechanism as recited in claim 2 wherein said extended member is a slanted arm with a cylindrical tip.

4. The disc loading mechanism as recited in claim 2 further comprising a round cavity at an end of said slanted slit.

5. The disc loading mechanism as recited in claim 4 wherein said rounded cavity has a flat bottom.

6. The disc loading mechanism as recited in claim 2 further comprising a lower arm on said lifter.

7. The disc loading mechanism as recited in claim 6 further comprising an opening in said chassis wherein said lower arm can be accessed through said opening when said sub-chassis is in a raised position such that said sub-chassis can be released from a locked raised position to a lowered position.

8. The disc loading mechanism as recited in claim 1 wherein said extended member is a slanted arm with a cylindrical tip.

9. The disc loading mechanism as recited in claim 1 further comprising a rectangular stop for fixing said linear gear bar in said second position of said gear back.

10. The disc loading mechanism as recited in claim 1 wherein said gear bar has a releasable flexible claw restraining said gear bar in position.

11. The disc loading mechanism as recited in claim 10 wherein said gear bar is fixed in said first position by a triangular stop.

12. The disc loading mechanism as recited in claim 10 further comprising a rectangular stop for fixing said linear gear bar in said second position of said gear back.

13. The disc loading mechanism as recited in claim 1 wherein said gear bar has two pegs.

14. The disc loading mechanism as recited in claim 13 wherein said loader tray has two separated thin panels, each panel having a hole with a rounded portion and an elongated portion, said hole receiving said pegs in the rounded portion and allowing said pegs to slide in the elongated portion.

15. The disc loading mechanism as recited in claim 1 wherein said gear bar has a panel.

16. The disc loading mechanism as recited in claim 15 wherein said lifter has cylindrical body with a hole, an upper arm with a cavity and a finger, and a wing portion with a slanted slit, said finger engaging with said panel to prevent rotation of said lifter.

17. The disc loading mechanism as recited in claim 1 wherein said sub-chassis is of a pivoting type.

18. The disc loading mechanism as recited in claim 17 further comprising a nipple extending out of said sub-chassis.

19. The disc loading mechanism as recited in claim 18 wherein said lifter has cylindrical body with a hole, said upper arm has a cavity and a wing portion with a slanted slit, said slanted slit receiving said nipple.

20. The disc loading mechanism as recited in claim 1 wherein said second mechanism is a gear train.

21. The disc loading mechanism as recited in claim 20 wherein said gear train includes a pair of cog wheels.

22. The disc loading mechanism as recited in claim 21 wherein said gear bar has teeth.

23. The disc loading mechanism as recited in claim 22 wherein said cog wheels have another get of teeth which are complementary to said teeth on said gear bar.

24. The disc loading mechanism as recited in claim 1 wherein, said extended member engaging with said first mechanism.

25. The disc loading mechanism as recited in claim 1 wherein said gear bar has a raised surface and a hollow area.

26. The disc loading mechanism as recited in claim 25 wherein said fourth mechanism is a flexible ramp which is depressed when engaged with said raised surface and undepressed when engaged to said hollow area.

* * * * *